UNITED STATES PATENT OFFICE.

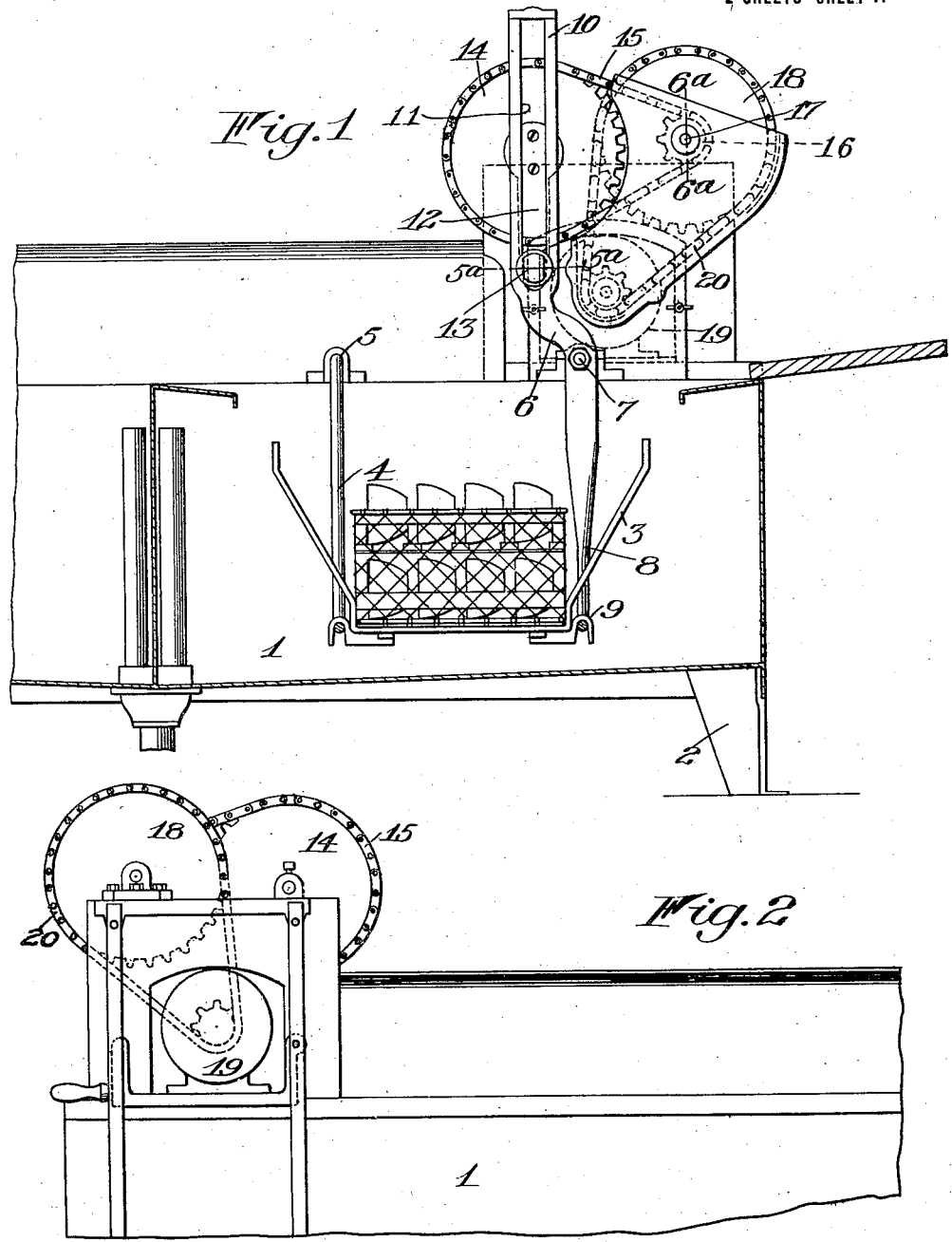

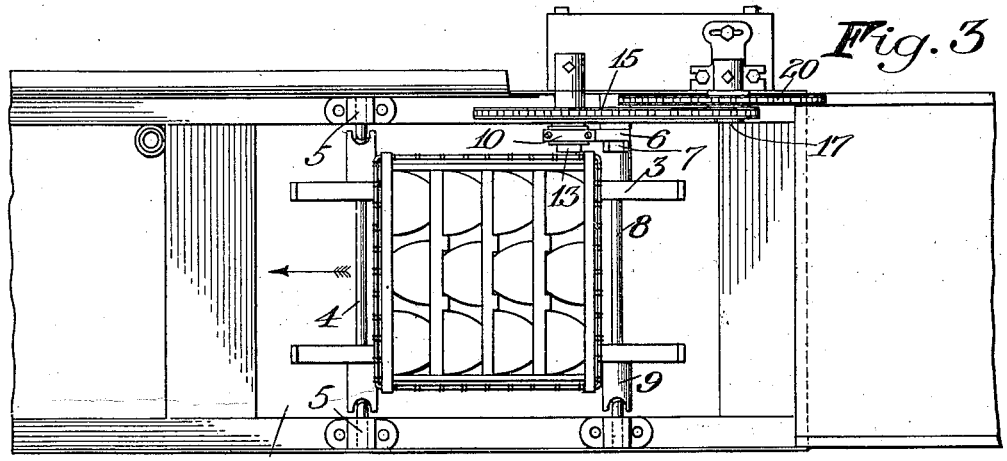
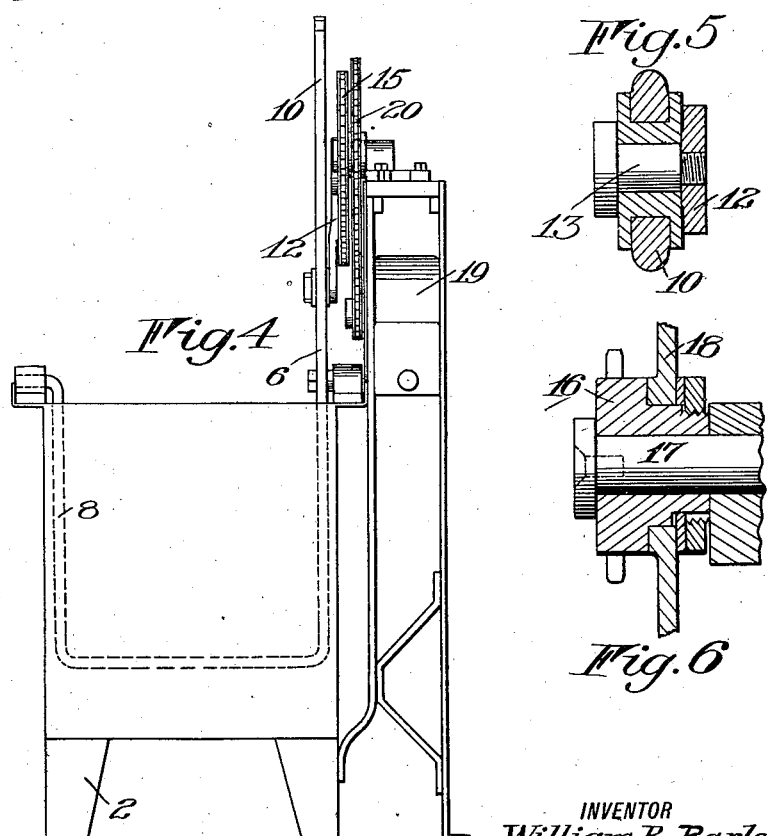

WILLIAM B. BARLEY, OF ROCHESTER, NEW YORK, ASSIGNOR TO FEARLESS DISH-WASHER COMPANY, OF ROCHESTER, NEW YORK, A CORPORATION OF NEW YORK.

DISH-WASHING MACHINE.

1,161,916.  Specification of Letters Patent.  Patented Nov. 30, 1915.

Application filed March 2, 1915. Serial No. 11,533.

*To all whom it may concern:*

Be it known that I, WILLIAM B. BARLEY, of Rochester, in the county of Monroe and State of New York, have invented certain new and useful Improvements in Dish-Washing Machines; and I do hereby declare the following to be a full, clear, and exact description of the same, reference being had to the accompanying drawings, forming a part of this specification, and to the reference-numerals marked thereon.

My invention has for its object to improve the operation of dish washing machines, with reference particularly to the class of machines which employs a dish receptacle that is movable within a liquid tank, and the purpose of the present structure is to increase the speed of operation and the general efficiency of the machine by effecting maximum agitation of the cleansing liquid and causing it to come into frequent and violent contact with the dishes.

It is my purpose to obtain the result stated by imparting an irregular motion to the receptacle, of such a nature that its movement in one direction is comparatively slow while having a much quicker return, and this causes the water in the tank to clean quickly and effectively as it creates the required wave action and results in a consequent more thorough intermingling of the water with the dishes.

To these and other ends the invention consists in certain improvements and combinations of parts, all as will be hereinafter more fully described, the novel features being pointed out in the claims at the end of the specification.

In the drawings: Figure 1 is a side view of a machine embodying one form of my invention; Fig. 2 is a side view looking in the opposite direction; Fig. 3 is a plan view; Fig. 4 is an end elevation; Fig. 5 is a detail sectional view on the line 5ª—5ª of Fig. 1, and Fig. 6 is a detail sectional view on the line 6ª—6ª of Fig. 1.

Similar reference numerals throughout the several views indicate the same parts.

In the present embodiment, the apparatus includes a tank 1 mounted on suitable legs 2, and adapted to contain a body of liquid such as soap and water within which the dishes are moved to and fro. This action is obtained through a frame for the dish holder or receptacle, which is laterally movable in the tank and reciprocated or oscillated back and forth in a manner that will presently be described. To this end I employ the frame 3 which may carry any suitable dish receptacle and is mounted at one end on a pivoted U-shaped support 4, arranged in bearings 5 and pivotally connected to the frame. Also connected to the frame 3 is a controlling lever 6 which is pivoted intermediate its top and bottom as at 7, the lower portion of the lever being formed into a U-shaped support 8 which is connected at its lower end to the bottom of the frame 3 as at 9. Owing to the distance between the pivotal point of lever 6 and its point of connection with the frame 3, it effects considerable movement of the frame, and while as heretofore constructed, the dish supporting frame travels at substantially the same speed in both directions, in the present structure provision is made for producing a faster movement of the lower end of lever 6 in one direction than in the other. This result may be accomplished in different ways and the structure which I am about to describe illustrates a preferred and satisfactory way of carrying out the purpose.

As already pointed out, the pivotal point of the lever 6 is substantially intermediate its top and bottom portions and the upper part 10 is slotted at 11 affording a slotted portion extending from its upper end to a point near its pivot. Operatively associated with the slotted portion of the lever is an actuating member in the form of a crank 12 having a pin 13 traveling in the slot 11. The crank is mounted on a shaft which carries a sprocket 14 driven by a chain 15 engaging the sprocket 16 which is fixed on the driving member or shaft 17. The latter also carries a sprocket 18 to which power is imparted from a motor 19 by a chain 20.

It will be seen that as the crank pin 13 approaches more nearly to the pivot 7 of the lever, it will cause a correspondingly greater throw of the lever, and vice versa, as it approaches the upper end of the lever away from its pivot, it produces a decreased movement. This action effects a corresponding differential movement of the dish holding frame, causing the dishes to be moved in the body of water forwardly at comparatively slow speed while the return movement is accomplished much more quickly and results in a sudden rush of the water, causing it to break over the dishes, and imparting a violent action that contributes to a quicker and more thorough cleansing operation.

While I have disclosed a particular means for carrying out the invention, I do not limit myself to the precise structure set forth, as the invention is intended to cover any equivalent arrangement which contemplates such an irregular movement of a dish holding frame in a tank, that the water is given a violent stirring or agitation upon each return stroke of the frame. With an arrangement of this character, it is possible to effect thorough cleaning of a large number of dishes in a minimum period of time.

I claim as my invention:

1. In a dish washing machine, the combination with a tank, of a dish supporting frame movable laterally in the tank, and automatic means acting to impart a faster movement to the frame in one direction than in the other.

2. In a dish washing machine, the combination with a tank, of a dish supporting frame movable laterally in the tank, and gearing connected to the frame and operating to drive it in one direction at a slow speed and in the opposite direction at a much faster speed.

3. In a dish washing machine, the combination with a tank, of a dish supporting frame movable laterally in the tank, a pivoted lever operatively connected to the frame and having a slotted portion, and an actuating member in engagement with the slotted portion and operating to drive the frame in one direction at a slow speed and in the opposite direction at a faster speed.

4. In a dish washing machine, the combination with a tank, of a dish supporting frame movable laterally in the tank, a lever pivoted intermediate its top and bottom, having its lower portion connected to the receptacle and its upper portion slotted, and a rotary member engaging said slotted portion and operating to drive the frame in one direction at a slow speed and in the opposite direction at a faster speed.

5. In a dish washing machine, the combination with a tank, of a dish supporting frame mounted on a plurality of pivoted supports and movable laterally in the tank, a lever pivoted intermediate its top and bottom and having its lower portion connected to the bottom of the receptacle, the upper part of the lever being slotted, and a crank having engagement with the slotted portion of the lever and operating to drive the frame in one direction at a slow speed and in the opposite direction at a faster speed.

6. In a dish washing machine, the combination with a tank, of a dish supporting frame mounted on a plurality of pivoted supports and adapted to be constantly immersed within a body of liquid in the tank and moved laterally therein, a lever pivoted intermediate its top and bottom and having its lower portion connected directly to the bottom of the receptacle, the upper part of the lever being slotted, and a crank having engagement with the slotted portion of the lever and operating to drive the dish supporting frame within the liquid in one direction at a slow speed, and in the opposite direction at a faster speed.

7. In a dish washing machine, the combination with a tank, of a dish supporting frame movable laterally in the tank, and means acting to impart a relatively faster movement to the dish supporting frame in one direction and a relatively slower movement to said frame in the opposite direction.

WILLIAM B. BARLEY.

Witnesses:
AGNES NESBITT BISSELL,
H. E. STONEBRAKER.